United States Patent
Menelli et al.

Patent No.: US 6,321,078 B1
Date of Patent: Nov. 20, 2001

(54) SYSTEM AND METHOD FOR PROVIDING EXPENSE REPORTS TO WIRELESS SERVICE SUBSCRIBERS

(76) Inventors: Ronald J. Menelli, 6819 Caminito Sueno, Carlsbad, CA (US) 92009; Paul M. Seckendorf, 14074 Davenport Ave., San Diego, CA (US) 92129; Steve Sprigg, 12124 Tavertine Ct., Poway, CA (US) 92064

(*) Notice: Subject to any disclaimer, the term of this patent is extended or adjusted under 35 U.S.C. 154(b) by 0 days.

(21) Appl. No.: 09/334,586

(22) Filed: Jun. 16, 1999

(51) Int. Cl.⁷ .................................. H04M 11/00
(52) U.S. Cl. ..................... 455/407; 455/575; 379/114
(58) Field of Search ............................ 455/405, 406, 455/407, 408, 409, 575, 566, 550, 418; 379/111, 112, 114

(56) References Cited

U.S. PATENT DOCUMENTS 5,577,100 * 11/1996 McGregor et al. ............... 455/406
6,026,291 * 2/2000 Carlsson et al. .................. 455/406

* cited by examiner

*Primary Examiner*—Doris H. To
(74) *Attorney, Agent, or Firm*—Philip R. Wadsworth; Charles D. Brown; George C. Poppas

(57) ABSTRACT

A system for providing immediate access to detailed information about a wireless call. The system includes a first mechanism for placing a wireless call. A second mechanism times the call to provide a call duration value. A third mechanism computes the detailed information from the call duration value and a predetermined value associated with the call. A fourth mechanism displays the detailed information. In a specific embodiment, the predetermine value is a billing rate associated with the call and the detailed information is expense information. The third mechanism includes a computer that runs software for computing the detailed information from the call duration value and the billing rate. The software includes a routine that detects when the wireless phone is being used for a call and times the call. The software also includes a mechanism for providing user-selectable parameters for controlling the third mechanism.

The user-selectable parameters include a first parameter that indicates use of one or more address book categories or lack thereof. The address book categories each indicate one or more calls to be tracked by the system. The user-selectable parameters further include a category for association with newly provided detailed call information, a per-minute billing rate corresponding to the predetermined value, and a type of currency to be used by the third mechanism for computing expense information. The software generates an expense report listing the detailed information in response to the receipt of the user selectable parameters and any other received call identifiers. In the illustrative embodiment, the fourth mechanism includes mechanism for displaying the detailed information in approximately real-time and includes a mechanism for automatically displaying or storing the detailed information upon completion of the call.

3 Claims, 3 Drawing Sheets

SYSTEM AND METHOD FOR PROVIDING EXPENSE REPORTS TO WIRELESS SERVICE SUBSCRIBERS

BACKGROUND OF THE INVENTION

I. Field of Invention

This invention relates to communications systems. Specifically, the present invention relates to systems and methods for tracking and displaying charges incurred by users of a wireless service.

II. Description of the Related Art

Wireless communications systems are used in variety of applications involving the transfer of voice and computer data files over a wireless channel via a wireless phone or other device such as a laptop computer. As the popularity of wireless services increases, so do the demands of wireless service customers. To remain competitive and meet the demands of customers, wireless service providers must continue to incorporate new user-friendly features into their wireless devices.

Features for reporting call duration and current expenses are particularly desirable as customers may wish to tailor their service usage in accordance with current expenditures. For example, customers such as attorneys may wish to keep track current call expenditures to facilitate client billing. Currently, to access expense information, a customer must wait for a statement in the mail or must make an additional phone call to the wireless service provider. Unfortunately, the additional phone call is often inconvenient may result in additional wireless charges, and waiting until a monthly billing statement arrives is undesirable, especially for customers wishing to budget usage in accordance with recently incurred expenses.

Some wireless phones include a call storage feature that stores information, such as call duration, pertaining to several most recent calls. Unfortunately, to determine call duration, customers often must navigate through a series of esoteric software commands. To estimate charges for a given call, a customer must manually calculate the charges by multiplying the call duration by the rate per minute. Manual expense calculation is often inconvenient and may result in reduced phone battery life as the user scrolls through menus to access information about the last call.

Hence, a need exists in the art for a user-friendly system and method for efficiently generating and displaying expense reports detailing a users current charges and call duration for a particular call.

SUMMARY OF THE INVENTION

The need in the art is addressed by the system for providing immediate access to detailed information about a wireless call of the present invention. In the illustrative embodiment, the inventive system is adapted for use with a wireless phone and includes a first mechanism for placing a wireless call. A second mechanism times the call and provides a call duration value in response thereto. A third mechanism computes the detailed information from the call duration value and a predetermined value associated with the call. A fourth mechanism displays the detailed information.

In a specific embodiment, the predetermined value is a billing rate associated with the call and the detailed information is expense information. The third mechanism includes a computer having a memory for storing the call duration value and the predetermined value. The computer runs software for computing the detailed information from the call duration value and the billing rate. The software includes a routine for detecting when the wireless phone is being used for a call and timing the call. The software also includes a mechanism for providing user-selectable parameters for controlling the third mechanism. The user-selectable parameters include a first parameter indicating use of one or more address book categories or lack thereof. The phone address book categories each indicate one or more calls to be tracked by the system. The user-selectable parameters further include a category for association with newly provided detailed call expense information, a per-minute billing rate corresponding to the predetermined value, and a type of currency to be used by the third mechanism for computing the expense information.

The software may receive identifiers, if available, indicating if the call is a standard incoming call, a standard outgoing call, an outgoing data call, an incoming call waiting call, an outgoing conference call, or a missed incoming call, a dialed number for outgoing calls, a caller ID number for incoming calls, an ID of a matching entry from an address book of the wireless phone, a time at which the call is placed, and the call duration. The software generates an expense report listing the detailed information in response to the receipt of the user selectable parameters and the identifiers. The detailed information includes a date on which the call was made, an expense category as chosen via a user-selectable parameter, a type of currency as chosen via an additional user-selectable parameter, and a cost associated with the call. The detailed information also includes an attendee list containing information pertaining to one or more parties involved in the call.

In the illustrative embodiment, the fourth mechanism includes mechanism for displaying the detailed information continuously in real-time and includes a mechanism for automatically displaying or storing the detailed information upon completion of the call.

The novel design of the present invention is facilitated by the use of unique software running on the computer within the wireless communications device of the present invention. The software maintains information pertaining to the call such as call duration and cost per minute that enable the software to readily display expense reports pertaining to each call. The expense reports may be categorized in accordance with an expense type, which facilitates accurate record keeping of calls made and received. The ability of a wireless phone to keep such records is particularly desirable as wireless phones are often employed in important business applications where accurate and timely expense records are important for billing purposes.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
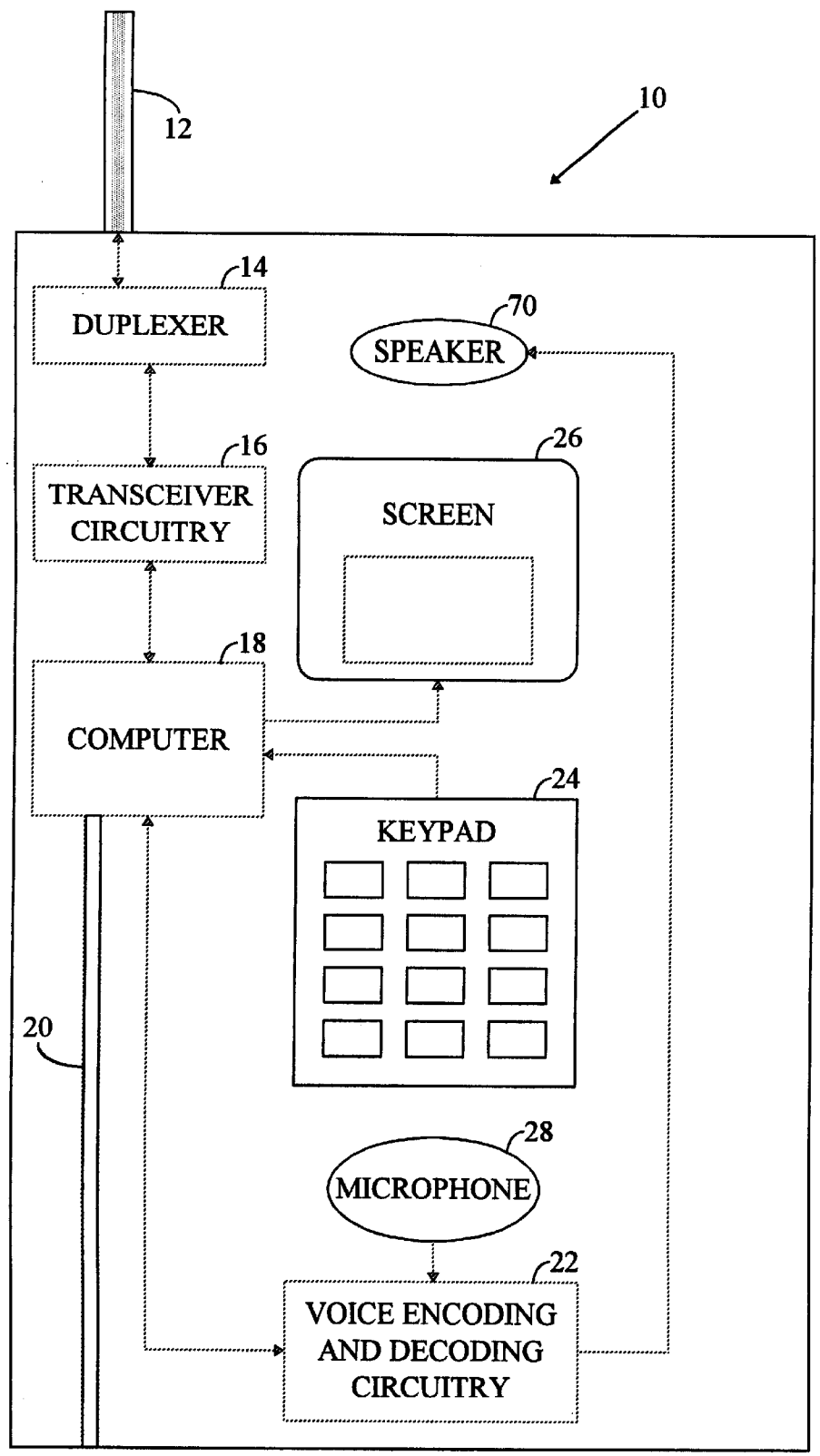
FIG. 1 is an exemplary diagram of a wireless phone constructed in accordance with the present invention.

FIG. 1 is an exemplary diagram of a wireless phone 10 constructed in accordance with the present invention. The wireless phone 10 is includes an antenna 12 connected to a duplexer 14. The duplexer 14 is connected to transceiver 16, which is connected to a computer 18. The computer 18 is connected to a data interface adapter 20, voice encoding and decoding circuitry 22, a keypad 24, and a screen 26. The voice encoding and decoding circuitry 22 is connected to a microphone 28 and a speaker 70. For clarity, additional circuitry such as clocking circuitry and power supplies are not shown in the wireless phone 26, but those ordinarily skilled in the art will know where and how to include the requisite additional circuitry.

In operation, the antenna 12 transmits and receives signals via the duplexer 14. The duplexer 14 facilitates sharing of resources of the antenna 12 between transmit and receive functions. The transceiver 16 includes transmit circuitry for transmitting signals such as encoded voice signals or service negotiation signals via the antenna 12 and duplexer 14. The transceiver 16 also includes receive circuitry for receiving signals such as service negotiation messages or encoded voice signals via another phone, base station, or mobile switching center. The transceiver 16 also includes downconversion circuitry required to convert receive signals to digital baseband signals in preparation for processing via the computer 18. In addition, the transceiver 16 includes upconversion circuitry required to convert transmit signals from digital baseband signals to radio frequency signals in preparation for transmission via the antenna 12.

A user may initiate a call by dialing a number via the keypad 24. The computer 18 negotiates a service connection with an available wireless service provider via the transceiver 16, the duplexer 14, and the antenna 12. When service is established, the user's voice is input to the microphone 28, encoded by the voice encoding and decoding circuitry 22 and transmitted via the computer 18, transceiver 16, duplexer 14, and the antenna 12. Similarly, received voice messages are decoded by the voice encoding and decoding circuitry 22 and as voice via the speaker 70. The data interface connection 20 allows software running on the computer 18 to be upgraded and/or changed.

The computer 18 runs software as discussed more fully below for selectively tracking calls received and placed by a user of the wireless phone 10 and reporting information about the call such as call expense. The software provides user-selectable options such as filtering criteria, cost per minute, and address book category, which are displayed on the screen 26. The user enters information pertaining to each option via the keypad 24 and the software then reads the information. The software then tracks the incoming or outgoing call in accordance with the user-selected options and displays information pertaining to the call in an expense report, which may be displayed in approximately real-time as the call is transpiring.

For example, in the present specific embodiment, the filtering criteria provide three user-selectable options including 'no calls', 'all calls', or 'category'. If 'no calls' is selected, then the software does not track incoming or outgoing calls. If 'all calls' is selected, then the software tracks all incoming and outgoing calls. If 'category' is selected, then the software tracks calls corresponding to incoming or outgoing calls that match a specific category of calls as set-up within an address book implemented by software running on the computer 18. The software times each call and multiplies the call duration in minutes by the cost per minute option entered previously by the user. Those skilled in the art will appreciate that other user options may be included or some user options such as category may be excluded without departing from the scope of the present invention.

Updates to the software may be made via the interface connection 20 or via files downloaded to the computer 18 via the antenna 12, duplexer 14, and transceiver circuitry 16. In addition, call expense information or other call information pertaining to phone calls tracked by the unique software of the present invention running on the computer 18 may be uploaded to an external computer (not shown) via the interface connection 20 or a wireless interface such as via the antenna 12. For example, call expense records may be uploaded to programs such as Quicken® running on an external computer (not shown) to further accommodate call expense record keeping.

Although the unique software of the present invention is shown implemented in the wireless phone 10, those skilled in the art will appreciate that the unique software may be easily adapted for use with other communications devices such as laptop or palmtop computers without departing from the scope of the present invention.

Figure 2:
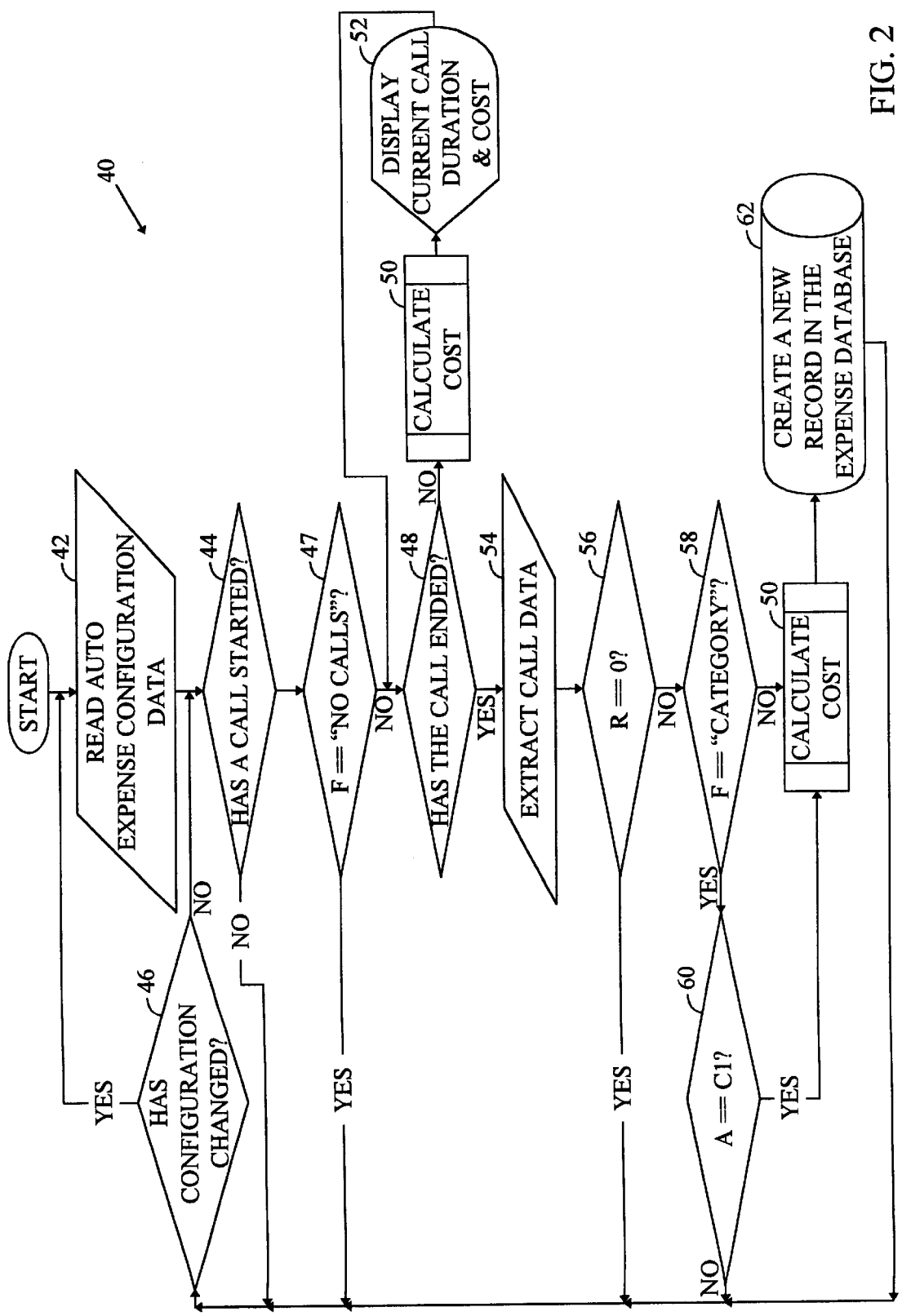
FIG. 2 is a flow diagram of software of the present invention adapted for use with the wireless phone of FIG. 1.

FIG. 2 is a flow diagram of a method 40 of the present invention implemented in software 40 running on the computer of FIG. 1. Those skilled in the art will appreciate that the method 40 may be implemented in hardware without departing from the scope of the present invention.

In an initial configuration reading step 42, the software requests information from the user pertaining to the following categories: filtering criteria (F), address book category (A), expense category (E), cost units (U), cost is currency (C), and cost per minute (V). In the configuration reading step 42, the software also receives identifiers, if available, indicating if the call is a standard incoming call, a standard outgoing call, an outgoing data call, an incoming call waiting call, an outgoing conference call, a missed incoming call, a dialed number for outgoing calls, a caller ID number for incoming calls, an ID of a matching entry from the address book, and a time at which the call is placed. Those skilled in the art will appreciate that other identifiers and fields may be included in the user-selectable parameters F, A, E, U, C, V and the received identifiers. The identifiers may be received via radio signals or derived from pre-existing software routines The F criteria include three options including a no calls option, an all calls option, and a category option. The user may select one of the options provided by the F criteria.

The A category provides a user-selectable option only if the selected F criterion is set to 'category'. If the F criterion is set to 'category', the A category allows the user to select an address book category. IF the user selects an address book category, the selected category is denoted as A for the purposes of the present discussion.

The E category allows the user to assign a category to calls that are tracked in accordance with the selected category A and the filtering criterion F. For example, an attorney might choose 'client calls' as and E category.

The U category allows the user to select time units for which call duration information will be displayed. The U category allows the user to select either minutes or hours as the time units.

The C category allows the user to select the type of currency to be used for purposes of expense calculations and call detail reporting.

The V category allows the user to enter the cost per minute or cost per hour based on the U category and charged to the user by the user's wireless service. By providing this option, a user need not remember billing rate after it is entered, which provides an added convenience to the user. Alternatively, the V category may be automatically determined via messaging sent to the wireless phone 10 of FIG. 1 by the wireless service provider.

The operation and software implementation of electronic address books are known in the art. The address book software incorporated in the present invention provides user definable address book categories, which may be easily implemented by one skilled in the art without undue experimentation.

Once the user is finished entering information via the keypad 24 of FIG. 1 pertaining to the above user-selectable parameters and options (F, A, E, U, C, V), the user presses enter and the software reads the entered configuration information. If the user wishes to later access and/or change the configuration information, the user may press a predetermined key sequence and software control returns to the initial configuration reading step 42.

Subsequently, control is passed to a call-checking step 44, where the software checks to see if a call has not yet begun. If a call has not yet begun, control is passed to a configuration-checking step 46. In the configuration-checking step 46, the software checks the configuration information set by the user in the configuration reading step 42 to determine if configuration information has changed. If the configuration information has changed, control is passed back to the configuration reading step 42. If the configuration information has not changed, control is passed back to the call-checking step 44. If in the call checking step 44 the software determines that a call has begun, control is passed to a no-calls-checking step 47.

In the no-calls-checking step 47 the software checks the selected F criterion in the configuration information to determine if the 'no calls' option is selected, i.e., if F ='no calls'. If F ='no calls' then control is passed back to the configuration-checking step 46. If F <> 'no calls' the control is passed to a call-end checking step 48.

In the call-end-checking step 48, the software checks to see if the current call has ended. IF the current call has not ended, control is passed to a cost-calculating process 50, which calculates the current cost of the phone call and subsequently displays the cost in a cost-displaying step 52. Subsequently, control is passed back to the call-end-checking step 48.

If the current call has ended as determined in the call-end-checking step 48, control is passed to a data-extracting step 54. In the data-extracting step 54, information pertaining to the completed call is derived. The address book is searched to see if the phone number associated with the call is known or can be found among received identifiers. If the phone number of the other calling party or called party is found in the address book, then the name (N) of the party and the category (C1) in which the name was found in the address book are taken from the matching address book record or entry. If the party is not found, the fields N and C1 corresponding to the name and category, respectively, are left blank. In addition, in the data-extracting step 54, call status (S), the phone number (P) of the called party or calling party, the time at which the call took place (T), the date (D) at which the call took place, and the duration (R) of the call are recorded. Subsequently, control is passed to a call-duration-checking step 56.

In the call-duration-checking step 56, the software checks if the call lasted 0 seconds. If the call lasted 0 seconds, then control is passed back to the configuration checking step 46. If the call lasted more than 0 seconds, then control is passed to a category-checking step 58. The duration of a call is rounded to the subsequent minute, for example, the duration of a call lasting more than one second and less than one minute is rounded up to one minute. The process of rounding up to the next minute is application-specific and may be altered without departing from the scope of the present invention.

In the category-checking step 58, the software checks the user-selected configuration information to determine if the F criterion is set to category, i.e., F='category'. If F <> 'category', control is passed to the cost-calculating process 50 and subsequently passed to a record-creation step 62. If F='category', control is passed to a category-comparing step 60.

In the category-comparing step 60, the software checks if the category C1 corresponding to the call is the category A selected by the user in the configuration-reading step 42. If A=C1, then control is passed to the cost-calculating process 50 and subsequently passed to the record-creation step 62.

In the record-creation step 62, the software generates a new record in an expense database implemented via the software. The record contains detailed information pertaining to the call including the category E, the type of call, such as 'telephone', the currency C, the name of the called or calling party N, the cost X, and notes corresponding to the fields call status S, name N, date D, time T, call duration R, and cost per minute V. The record may also contain information pertaining to the received identifiers such as a caller identification number, i.e., the phone number of the calling party or called party. The resulting record may be automatically displayed on the display screen 26 of FIG. 1 or may be stored so that the user may access the stored information by pressing a predetermined sequence of keys on the keypad 24 of FIG. 1. Those skilled in the art will appreciate that other commands such as voice commands may be employed to access stored records without departing from the scope of the present invention. Control is subsequently passed back to the configuration-checking step 46.

Figure 3:
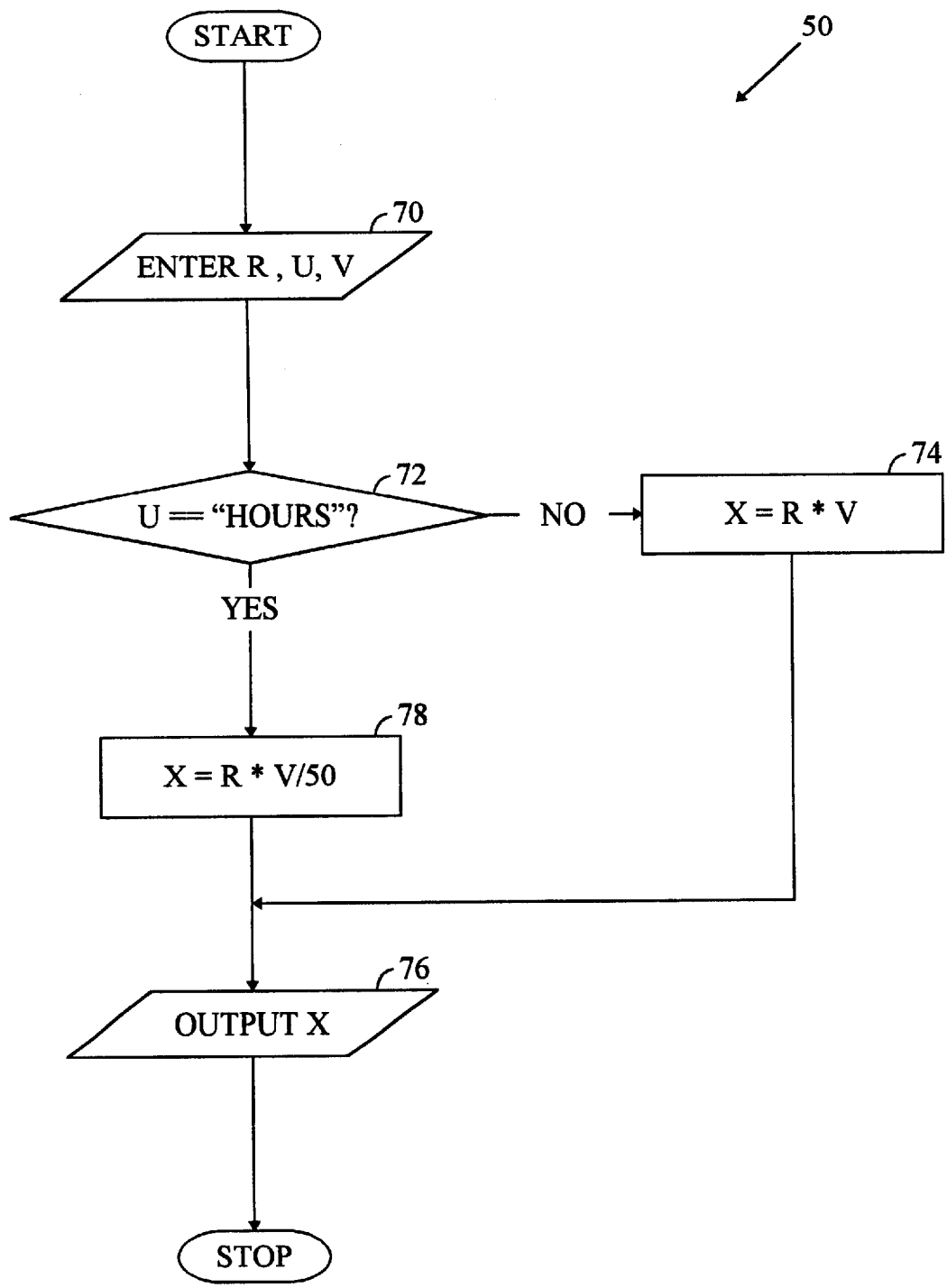
FIG. 3 is a more detailed flow diagram of the cost-calculating process of FIG. 2.

FIG. 3 is a more detailed flow diagram of the cost-calculating process 50 of FIG. 2. In an initial cost-parameter step 70, the software checks the current duration of the call as timed via a timer included in the software and obtains the cost units U parameter and the cost per minute V parameter from configuration information entered by the user in the configuration-reading step 42 of FIG. 2.

Subsequently, control is passed to a cost-units-checking step 72. In the cost-units-checking step 72, the software checks if the U parameter is set to hours, i.e., U='hours'. If U<> 'hours', then U='minutes' and control is passed to a first cost-computing step 74. In the first cost-computing step 74, the duration of the call R in minutes is multiplied by the cost per minute V to yield the current cost of the call X. Control is subsequently passed to a cost-outputting step 76 where the cost of the call X is displayed via the display screen 26 of FIG. 1 in terms of the currency units C as entered in the configuration-reading step 42 of FIG. 2, and the process 50 is complete.

If in the units-checking step 72 U='hours', then control is passed to a second cost-calculating step 78 where the cost of the call is calculated by multiplying the call duration R in minutes by the billing rate (cost per hour) V divided by 60 minutes per hour to yield the cost of the call.

Control is then passed to the cost-outputting step 76 where the current cost of the call is displayed approximately in real time, and the process 50 is complete.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. In a wireless device, a method of selectively tracking and recording charges incurred by a user of the wireless device, comprising:

identifying when the wireless device is involved in a call;

identifying a user-defined category associated with the call;

calculating current call cost as a function of call duration;

displaying, on the basis of user-selectable features, at least the current call cost while call is in progress;

identifying when the call is ended;

recording final call cost in an expense database record corresponding to the user-defined category;

adding the final call cost to a previous final cost value associated with the category to generate an updated value; and displaying, at user request and as a function of the associated user-defined category, the updated value to facilitate tracking and displaying charges for the user-defined category.

2. The method of claim 1, further comprising uploading from the wireless device at least a portion of the expense database for access by another device.

3. The method of claim 1, wherein the user-selectable features includes type of currency.

* * * * *